July 9, 1963 R. G. CARDWELL 3,096,706
PORTABLE SMOKELESS BROILER AND OVEN ASSEMBLY
Filed April 26, 1961 3 Sheets-Sheet 1
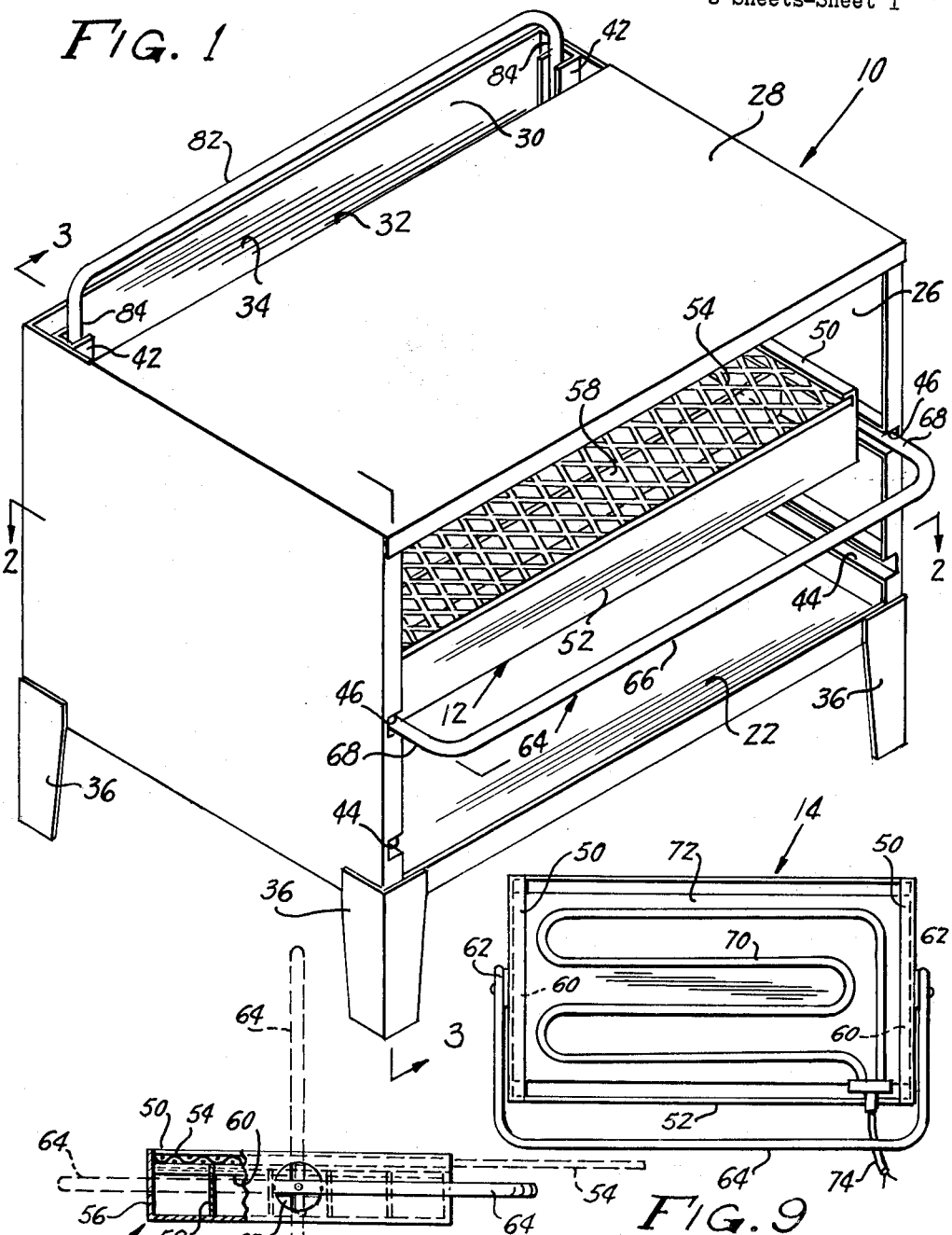
INVENTOR.
ROBERT G. CARDWELL
BY
ATTORNEY.

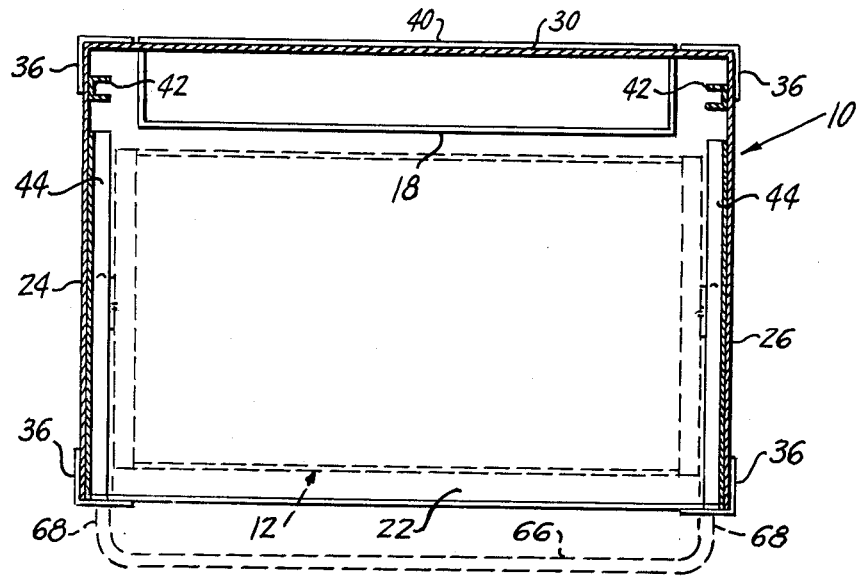
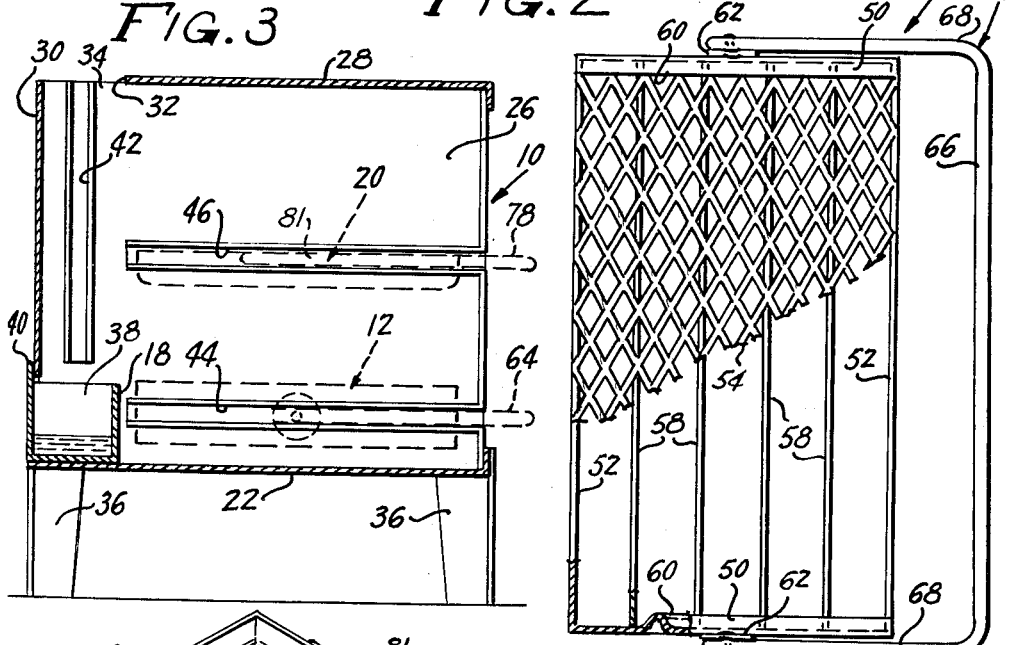
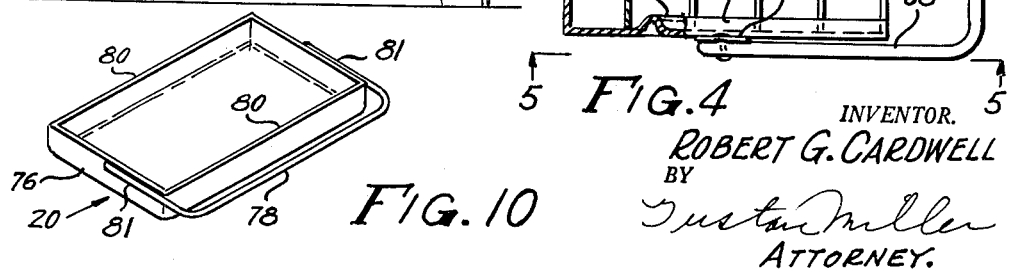

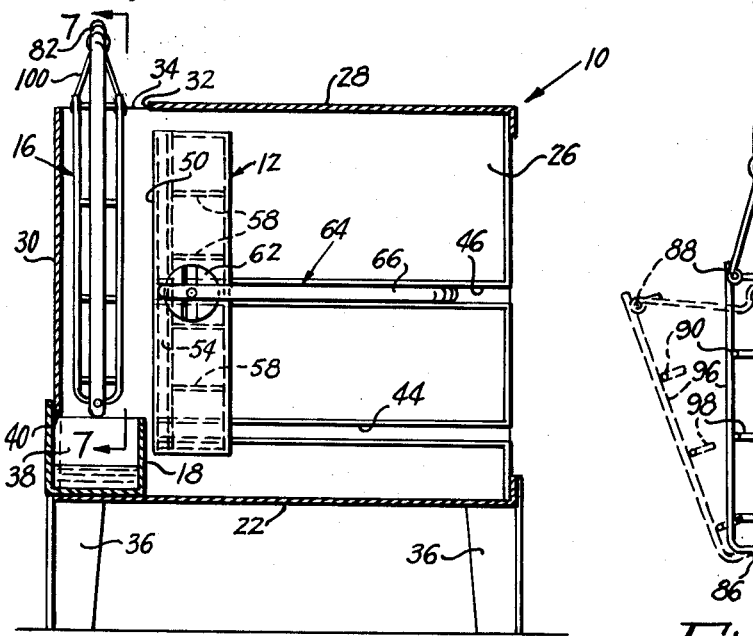

United States Patent Office 3,096,706
Patented July 9, 1963

3,096,706
PORTABLE SMOKELESS BROILER AND
OVEN ASSEMBLY
Robert G. Cardwell, 54 Extension St., Hazlehurst, Miss.
Filed Apr. 26, 1961, Ser. No. 105,740
5 Claims. (Cl. 99—340)

This invention relates to a portable smokeless broiler and oven assembly and has for an object to provide improved combination portable oven and smokeless broiler assembly wherein there is provided an oven, a heating unit and a food basket with which is selectively used a drip pan and a food pan, so that the assembly may provide either a smokeless broiler or an oven.

A further object of this invention is to provide a broiler and oven assembly wherein a heating unit is so arranged that it may extend vertically adjacent a vertically placed food basket, or may extend horizontally beneath a horizontally placed food pan or beneath the oven top, a drip pan being arranged to be placed beneath the vertically extending food basket, whereby all drippings from the food will be caught in the drip pan and avoid the adjustably spaced vertically extending heating unit, thus avoiding any contact between food drippings and heating unit which, of necessity, would produce smoke.

A further object of this invention is to provide a comparatively inexpensive portable broiler and oven assembly which will be used as a broiler so arranged as to avoid producing smoke but, if desired, may be so rearranged that it will, of necessity, produce smoke, as when the heating unit is fueled by a combustion product, such as hickory wood for instance, whose smoke imparts a desired flavor to the food being broiled.

Thus, it is an object of this invention to provide a very versatile broiler and oven assembly which may be arranged to be used as an oven, as a smokeless broiler, or as a smoke producing broiler.

With the above and related objects in view, this invention consists in the details of construction and combination of parts, as will be more fully understood from the following description, when read in conjunction with the accompanying drawings, in which:

FIG. 1 is an isometric view of the portable broiler and oven assembly, with the heating unit shown in oven top heating position, and the food basket in stored position.

FIG. 2 is a sectional view on line 2—2 of FIG. 1, the food basket being omitted.

FIG. 3 is a sectional view on line 3—3 of FIG. 1, showing the operating position of a food pan above the heating unit.

FIG. 4 is a plan view of the heating unit in the form of a charcoal firebox, partly in section.

FIG. 5 is an end view on line 5—5 of FIG. 4, partly in section, and showing how the charcoal retaining grid is removable.

FIG. 6 is a view similar to FIG. 3, with the food basket and the heating unit in position for smokeless broiling.

FIG. 7 is an elevational view of the food basket on line 7—7 of FIG. 6.

FIG. 8 is a sectional view on line 8—8 of FIG. 7, showing also the open position of the food basket.

FIG. 9 is a plan view of the heating unit, including an electrical heating element thereon, and FIG. 10 is an isometric view of a food pan.

The combination grill and oven assembly of this invention includes a broiler oven 10, a heating unit 12 or 14, a food basket 16, a drip pan 18, and a food pan 20.

The broiler oven 10 comprises a rectangular bottom panel 22, a vertically extending side panel 24 and a second vertically extending side panel 26 secured at two opposite ends of the bottom panel 22 and supporting the two opposite ends of an oven top panel 28. A back panel 30 extends between the rear vertical edges of the two side panels 24 and 26, while the front of the oven between the forward ends of the side panels and the top and bottom panel is left open. The top panel 28 has its rear edge 32 spaced forwardly of the top edge of rear panel 30, thus providing a slot for the entry of the food basket, as hereinafter described, and the back panel 30 has its bottom edge spaced above the bottom panel 22 providing a slot for entry of the drip pan 18. The food basket slot 34 is of a sufficient width to permit the food basket 16 to enter comfortably therein.

Supporting legs 36 may also be provided at each corner of the bottom panel 22 for spacing the bottom panel 22 above the floor or ground level, as desired. In addition, the panels may each be provided with suitable edge flanges, as shown.

The drip pan 18, as shown, is an open box-like member having its forward and side edges 38 of a height that will enter through the slot beneath the back panel 30, while its rear side 40 is too high to enter the slot and thus acts as a stop for suitably positioning the drip pan 18 in appropriate position, this being just beneath the food basket opening 34.

Extending vertically below the slot 34 and secured on the inner faces of the opposite vertical side panels 24 and 26 are a pair of opposed U-shaped rails 42, the rails 42 terminating sufficiently above the bottom panel 22 to permit the drip pan 18 to be placed in position thereunderneath. Two vertically spaced pairs of similar U-shaped rails 44 and 46 are secured to the same inner faces of the vertical side walls 24 and 26, and extend horizontally from the front open end toward the rear of the oven, stopping at a position just short of the vertical projection of the back edge 32 of the top panel 28, the lower pair of rails 44 being somewhat adjacent the bottom panel 22, but spaced sufficiently therefrom to support the heating unit in horizontal position above the bottom panel 22, and the upper pair of rails 46 being spaced approximately midway between the bottom panel 22 and the top panel 28.

As shown in FIGS. 4 and 5, the heating unit 12 may be a box-like member having opposite side edges 50 extending above the front wall 52, extending side edges 50 being turned inwardly and then outwardly to provide rails 60 for removably receiving a charcoal retaining grid 54 therein, the grid 54 abutting the back wall 56. A plurality of vertically extending parallel partitions 58 are secured between the side walls, whose upper edges provide the beaded rails 50.

Pivotally secured at 62 to the side walls is a U-shaped handle and rail cooperating element 64, the bight of the U-shaped element 64 providing a handle 66 and the legs 68 of U-shaped element 64 providing rail cooperating means, the portions 68 being of a diameter that they will fit comfortably within any of the U-shaped rails 42, 44 or 46. As observed, the removable grid 54 has diamond-shaped grid openings, and must be at least temporarily removed so that charcoal may be placed into the pockets provided by the partitions 58 therein. As a result of these partitions 58, the charcoal placed in the pockets will remain substantially in the same position, irrespective of whether the charcoal carrying heating unit 12 is pivoted to a horizontal position, as shown in FIG. 1, or to a vertical position as shown in FIG. 6.

Instead of using charcoal as a heating means, an electrical heating element of any conventional type such as shown at 70, consisting of a zig-zag shaped heating element of the type often used on electrical oven tops, is suitably supported in slightly raised position on a plate 72 of appropriate material, the outside dimensions of plate 72 being the same as the outside dimensions of the grid 54 in the charcoal heating unit 12. As thus arranged in electrical heating unit 14, the plate 72 with its electrical heating element 70 connectable by a conduit 74 to any suitable source of electricity, may be substituted in place of the grid 54, thus converting the charcoal heating unit 12 into an electrical heating unit 14. The other details of the unit 14 may be identical with those of the unit 12, and the same reference numerals are therefore applied to the remaining parts, the upper edges of the partitions 50 assisting in supporting the plate 72 in the same manner that they assist in supporting the grid 54.

The food pan 20 shown in FIGS. 3 and 10 consists of an open box-like member 76 having a U-shaped handle and rail cooperating means 78, substantially identical with the handle and rail cooperating means 64 of the heating unit, rigidly secured along two opposite upper edges of opposite sides of the food pan 76, the rail cooperating legs of the U-shaped handle 78 being shown at 81, and as secured to the side walls between the front and rear walls 80.

A similar U-shaped handle 82, wherein the bight of the U-shaped handle 82 provides the handle and the legs 84 of the U-shaped handle 82 are of suitable size to fit and be guided in any of the pairs of rails, either the vertical rails or the horizontal rails. At the ends of the rail cooperating legs 84, there is provided a connecting rod 86 through which are pivoted two somewhat pan-shaped grids 88. The grids 88 are rectangular members consiting of a plurality of rods connected into a gridwork, the opposite ends of each horizontal rod 90 being inturned as at 98 to close the ends of the basket, while the top ends 94 of the vertical rods 96 provide an open top of the basket. The bottom ends 92 of vertical rods 96 are looped about the pivot rod 86 and thus act to pivot the two halves of the basket between open and closed position. When pivoted to closed position, they are held in closed position by a spring clamp 100 shaped approximately as shown. Obviously, suitably sized pieces of food may be dropped into the open top of the basket without removing the clamp 100. Any type of food, such as meat or other type of food may, of course, be placed in the food basket, the type of food being a type that is suitable for broiling purposes.

In operation, the handle and rail cooperating element of each of the heating units, the food pan and the food basket may be inserted in any pair of opposed rails, either for use or for storage. The food basket 16 is generally used for broiling. If smokeless broiling is desired, the drip pan 18 is inserted through its entry slot at the bottom of the back panel 30 as far as permitted by its upwardly extending edge 40, thus placing it properly in position between and beneath the vertically extending rails 42. The food basket, suitably filled with the desired type of food and closed by its clamp 100 is placed down through the slot 34 between the vertically extending rails 42. The heating unit, either 12 or 14, is pivoted to a vertical position on its U-shaped handle 64 and the legs 68 of handle 64 are inserted in the upper pair of horizontal rails 46, the basket being brought to a desired distance adjacent to and spaced from the food basket 16. This will broil the food on the side of the food basket 16 adjacent the heating face of the heating unit 12, the grid 54, of cource, having been placed on the side adjacent the food basket 16, and the partitions 58 keep the charcoal briquets therein in proper vertically spaced position, even through the heating unit now extends vertically. When one side of the food in the food basket 16 has been broiled to the desired amount, it is lifted up by means of its handle 82 and reversed, so as to bring the other side adjacent the broiling surface of the grid 50 of the heating unit 12. Drippings from the food in the basket will enter the drip pan 18 and not contact the heating element as thus assembled, the broiler oven 10 may be used indoors if desired, as well as outdoors—indoors, of course, preferably, in a suitable location. Alternatively, the electrical heating element 14 may be substituted for the charcoal heating element 12 and mounted and used in the same manner, particularly where a source of electricity is available such as near a home, or indoors, within the home.

If the charcoal is of the type that produces a smoke that flavors the heat or other food in the food basket, then the charcoal heating unit 12 may be placed horizontally in the lower pair of rails 44 and the food basket 16 may be placed in a horizontal position in the upper rails 46, the position shown by the food pan 20 in FIG. 3. If the food is of the type that may not be broiled but must be placed in a pan, then obviously, the food pan 20 will be placed on the horizontal rails 46 and either a charcoal heating unit 12 or an electrical heating unit 14 may be placed in the lower rails 44. If desired, any conventional type of cooking or baking pot may be placed on the oven top panel 28, in which case, the heating unit 12 or 14 may be placed in the upper rails 46, as illustrated in FIG. 1.

Thus, the various portions of this assembly may be arranged in a desired manner according to the purpose or function that it is desired to perform. The heating unit may be used to produce smoke, if desired, or may be used in a manner to avoid producing smoke—it may be used for broiling, it may be used for heating a pan of food within the oven, or for heating the oven top panel and for cooking food in any conventional place thereon.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A portable smokeless broiler and oven assembly comprising an oven, a heating unit, a food basket and a drip pan, said oven comprising a rectangular horizontal bottom panel, a vertical side panel secured to each of two opposite ends of said bottom panel, an oven top panel supported on said vertical panels, and a back panel secured to the back edges of said side panels, the bottom edge of said back panel being spaced above said bottom panel providing a drip pan entry slot therebetween, the back edge of said top panel being spaced forwardly of said back panel providing a food basket entry slot, the front of said oven being open, a pair of opposed vertical U-shaped rails secured to the inner surfaces of said opposite vertical side panels and extending downwardly from said oven top panel back slot, and opposed horizontal rail means secured to said inner surfaces of said opposite vertical side panels forwardly of said vertical rail means and extending rearwardly from the open front of said oven, rail means cooperating means pivoted centrally to opposite edges of said heating unit, and a rail means cooperating means secured to two opposite edges of said food basket, said drip pan being placed through said drip pan entry slot to beneath and between said vertical rail means, said food basket being supported vertically in said vertical rail means above said drip pan and said heating unit pivoted to vertical position being supported adjacent said food basket by its pivotal rail means cooperating means extending into said horizontal rail means.

2. The assembly of claim 1, and a food pan, and a rail means cooperating means secured to opposite edges of said food pan, said opposed horizontal rail means comprising two vertically spaced apart pairs of opposed rails, whereby said assembly may act as an oven when said food pan is supported in the upper pair of opposed horiof the heating unit 12. Thus, no smoke is produced, and zontal rails above said heating unit, said heating unit being pivoted to horizontal position and being supported by its handle means in said lower horizontal rails.

3. The assembly of claim 1, said heating unit comprising a fire box having one open side, a plurality of partition members secured between said pivoted edges thereof and extending toward said open side, and a grill slidably mounted on said fire box over said open side.

4. The assembly of claim 2, each said rail means cooperating means being U-shaped, the bight at said U-shaped means providing a handle portion, the legs of said U-shaped means providing rail cooperating portions.

5. A portable broiler and oven assembly comprising an oven, a heating unit, a drip pan, and a food basket, said oven comprising a rectangular horizontal bottom panel, a vertical side panel secured to each of two opposite ends of said bottom panel, an oven top panel supported on said vertical panels, and a back panel secured to the back edges of said side panels, the bottom edge of said back panel being spaced above said bottom panel providing a drip pan entry slot therebetween, the back edge of said top panel being spaced forwardly of said back panel providing a food basket entry slot, the front of said oven being open, a pair of opposed vertical U-shaped rails secured to the inner surfaces of said opposite vertical side panels and extending downwardly from said oven top panel back slot, and opposed horizontal rail means secured to said inner surfaces of said opposite vertical side panels and extending rearwardly from the open front of said oven, rail means cooperating means pivoted centrally to opposite edges of said heating unit, and rail means cooperating means secured to two opposed edges of said food basket, said opposed horizontal rail means comprising vertically spaced apart pairs of opposed rails, said food basket being supported in the upper pair of horizontal rails, said heating unit being supported in a horizontal position by the lower pair of horizontal rails, and said drip pan being in said entry slot.

References Cited in the file of this patent
UNITED STATES PATENTS

| | | |
|---|---|---|
| 1,903,324 | Codling | Apr. 4, 1933 |
| 2,852,654 | Magin | Sept. 16, 1958 |
| 2,866,883 | Borden | Dec. 30, 1958 |
| 2,885,950 | Stoll et al. | May 12, 1959 |
| 2,956,497 | Bernstein | Oct. 18, 1960 |